(12) United States Patent
Svehag et al.

(10) Patent No.: US 12,416,307 B2
(45) Date of Patent: Sep. 16, 2025

(54) ASYMMETRIC ROTOR INCLUDING A CUTTING EDGE AND A PUMP THAT INCLUDES THE ASYMMETRIC ROTOR

(71) Applicant: HAARSLEV INDUSTRIES A/S, Sonderso (DK)

(72) Inventors: Anders Svehag, Odense V (DK); Lars Holton, Odense N (DK)

(73) Assignee: HAARSLEV INDUSTRIES A/S, Sonderso (DK)

(*) Notice: Subject to any disclaimer, the term of this patent is extended or adjusted under 35 U.S.C. 154(b) by 696 days.

(21) Appl. No.: 17/616,251

(22) PCT Filed: Jun. 3, 2020

(86) PCT No.: PCT/EP2020/065360
§ 371 (c)(1),
(2) Date: Dec. 3, 2021

(87) PCT Pub. No.: WO2020/245204
PCT Pub. Date: Dec. 10, 2020

(65) Prior Publication Data
US 2022/0243727 A1 Aug. 4, 2022

(30) Foreign Application Priority Data
Jun. 6, 2019 (DK) .......................... PA 2019 00691

(51) Int. Cl.
*F04C 2/12* (2006.01)
*A22C 17/00* (2006.01)
(Continued)

(52) U.S. Cl.
CPC .............. *F04C 2/126* (2013.01); *A23L 13/20* (2016.08); *A23L 13/60* (2016.08); *B02C 18/142* (2013.01);
(Continued)

(58) Field of Classification Search
CPC ......... A23L 13/20; F04C 2/126; F04C 18/126
See application file for complete search history.

(56) References Cited

U.S. PATENT DOCUMENTS 2,460,278 A * 2/1949 Cook ...................... F04C 2/123
241/185.6
3,396,667 A   8/1968 Schmitt
(Continued)

FOREIGN PATENT DOCUMENTS

CN   104305271 A *  1/2015 ............... A23L 1/22
DE   100 30 957 C1   2/2002
(Continued)

OTHER PUBLICATIONS

Search Results under Rule 164(2)(b) EPC, Application EP 20732140, search completed May 3, 2024, 1 page.
(Continued)

*Primary Examiner* — Laert Dounis
(74) *Attorney, Agent, or Firm* — Francis J. Maguire; WARE FRESSOLA MAGUIRE & BARBER LLP

(57) ABSTRACT

A rotor is shown with an asymmetrical structure for a pump, wherein the rotor includes at least one cutting edge and at least one rounded edge, as well as the pump as such including one or more rotor(s). The rotor (1) has a first circular element (4) where a material-moving cavity (5) is provided in the first circular element (4).

16 Claims, 3 Drawing Sheets

(51) Int. Cl.
  *A23L 13/20* (2016.01)
  *A23L 13/60* (2016.01)
  *B02C 18/14* (2006.01)
  *B02C 18/18* (2006.01)
  *F04C 2/18* (2006.01)
  *F04C 13/00* (2006.01)
  *F04C 15/06* (2006.01)

(52) U.S. Cl.
  CPC .............. *B02C 18/18* (2013.01); *F04C 2/123* (2013.01); *F04C 2/18* (2013.01); *F04C 13/001* (2013.01); *F04C 15/06* (2013.01); *A22C 17/0026* (2013.01); *A23V 2002/00* (2013.01); *F04C 2240/20* (2013.01); *F04C 2250/20* (2013.01)

(56) References Cited

U.S. PATENT DOCUMENTS

| | | | | |
|---|---|---|---|---|
| 4,430,050 A | * | 2/1984 | Blazejewski | F01C 1/123 418/191 |
| 4,867,659 A | | 9/1989 | Eiermann et al. | |
| 4,984,975 A | * | 1/1991 | Thompson | F04C 2/084 418/181 |
| 5,772,968 A | | 6/1998 | Wolfe | |

FOREIGN PATENT DOCUMENTS

| | | |
|---|---|---|
| DK | 2012 00207 A1 | 9/2013 |
| DK | 201200207 A * | 9/2013 |
| EP | 2 832 236 A1 | 2/2015 |
| EP | 3 192 377 A1 | 7/2017 |
| GB | 1 405 955 A | 9/1975 |
| JP | H03-175183 A | 7/1991 |
| WO | 2015/014859 A2 | 2/2015 |

OTHER PUBLICATIONS

International Search Report, Application No. PCT/EP2020/065360, mailed Oct. 20, 2020, 5 pages.
Written Opinion of the International Searching Authority, Application No. PCT/EP2020/065360, mailed Oct. 20, 2020, 12 pages.
Danish Patent and Trademark Office, Search Report, for Danish Patent Application No. PA 2019 00691, report completed Nov. 26, 2019, 4 pages.
Machine translation of description, Japanese Patent Application Publication No. JP H03-175183, 6 pages, Jul. 30, 1991.

* cited by examiner

ASYMMETRIC ROTOR INCLUDING A CUTTING EDGE AND A PUMP THAT INCLUDES THE ASYMMETRIC ROTOR

TECHNICAL FIELD OF THE INVENTION

The present invention relates to a rotor for a pump. In particular the present invention relates to a positive displacement pump which is capable of moving and grinding inhomogeneous materials.

BACKGROUND OF THE INVENTION

Positive displacement pumps, like rotary pumps or lobe pumps are traditionally used in a variety of industries, including pulp and paper, chemical, food, beverage, pharmaceutical, and biotechnology. They are popular in these diverse industries because they offer superb sanitary qualities, high efficiency, reliability, corrosion resistance and good clean-in-place and steam-in-place (CIP/SIP) characteristics.

Lobe pumps are a preferred choice since they handle solids without damaging the product. Furthermore, the particle size pumped can be much larger in lobe pumps than in other positive displacement pumps.

In operation, the material to be pumped, comprising small and/or large particles, is allowed to move around the interior wall of the pumping chamber of the pump where the rotors are located. The rotors comprise impellers that provides the movement of the material and the rotor may comprise a single-impeller, a double-impeller, a tri-impeller or a multiple-impeller. Traditionally the lobe pump is provided with two identical rotors with double-impeller, secured substantially perpendicular to each other. If the number of impellers are different from a double-impellers the angle between the rotors are different. The two rotors are placed close to each other and close to the interior wall of the pumping chamber, but without the rotors touching either each other or the interior wall of the pumping chamber.

As the rotor rotates, the impeller creates an expanding volume on the inlet side of the pump. The material to be pumped moves into this cavity. Rotation of the impeller past the inlet port creates enclosed volumes of material between the rotors and the wall of the pumping chamber.

The material to be pumped moves around the wall of the pumping chamber in these enclosed volumes between the rotor and the wall of the pumping chamber from the inlet to the outlet of the pump, without having the material does to pass between the rotors.

Continued pumping forces the pumped material to move out through the outlet of the pump and the material may be feed for further processing.

The problem with the traditional available lobe pumps is that they provides no shredding or grinding effect on the particles or solid parts of the material and inhomogeneous material to be pumped.

DK 2012 00207 describes a displacement pump consists of an oval housing on a foot with a rectangular inlet and outlet opening. The displacement pump comprises two identical and symmetrical rotors having a material moving cavity, which has both a leading cutting edge and a tailing cutting edge for shredding and grinding the particles or solid parts of the material and inhomogeneous material to be pumped.

The problem with the devices capable of pumping and shredding/grinding the particles or solid parts of the material and inhomogeneous material to be pumped, such as the pump described in DK 2012 00207, is that the particles and the solid parts may become entrapped between the two rotors and between the rotors and the wall of the pumping chamber, resulting in increased friction of the rotors and the pump, a need for higher energy input to provide sufficient pumping effect and resulting in an increased wear of the rotors and the pump.

Hence, an improved rotor and pump would be advantageous, and in particular an improved rotor and pump which avoid or reduce the incidence of having particles entrapped between the rotors; which has a reduced friction of the rotors and the pump; which is more efficient; which has reduced maintenance costs; and which has reduced wear, and a pump that may operate dry without damaging the rotor and/or the pump.

SUMMARY OF THE INVENTION

Thus, an object of the present invention relates to a rotor and a rotary pump comprising the rotor which is capable of pumping and grinding inhomogeneous materials.

In particular, it is an object of the present invention to provide a rotor and a pump that solves the above mentioned problems of the prior art with having particles entrapped between the rotors; which has a reduced friction of the rotors and the pump; which is more efficient; which has reduced maintenance costs; and which has reduced wear, and a pump that may operate dry without damaging the rotor and/or the pump.

Thus, one aspect of the invention relates to a rotor for a pump comprising an asymmetrical structure, wherein the rotor comprises at least one cutting edge and at least one rounded edge.

Another aspect of the present invention relates to a pump, comprising one or more rotors according to the present invention.

Yet an aspect of the present invention relates to a method for producing a digestible material, from a material selected from feather; hair; hoof; nails, bone, meat or a combination hereof, said method comprising the steps of:
  (i) moving and grinding the material to a hydrolyzer using a grinding pump;
  (ii) hydrolyzing the grinded material providing a hydrolyzed material; and
  (iii) drying the resulting hydrolyzed material providing the digestible material.

Still another aspect of the present invention relates to a use of a pump according to the present invention in moving and grinding a rendering material.

Figure 1:
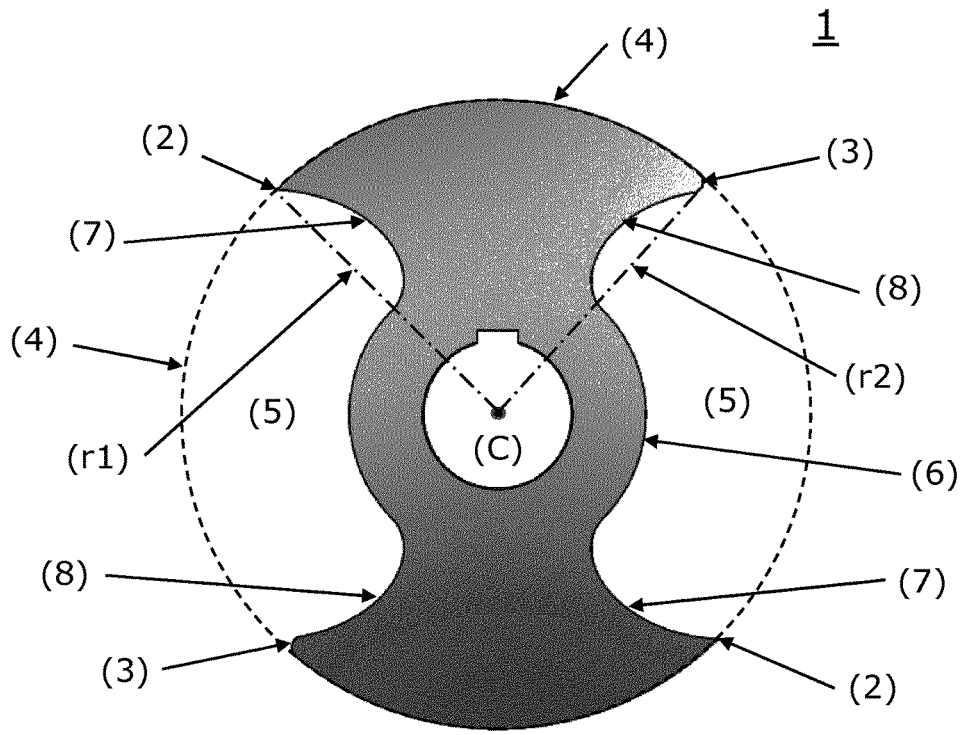
FIG. 1 shows a front view of the rotor (1) according to the present invention with the cutting edges (2) and the rounded edges (3)

The present invention will now be described in more detail in the following.

DETAILED DESCRIPTION OF THE INVENTION

Accordingly, the present inventors found a problem in the presently provided rotors and pumps as the friction between the rotors quickly was increased as particles became entrapped between the rotors during rotation, whereby the hard particles wears the rotors and additional energy must be supplied in order to provide the desired pumping effect. The increased wear also resulting in frequent process-shutdowns and frequent replacement of rotors.

The inventors surprisingly found that a specialised design or structure of the rotor was solving this problem and where particles are allowed to escape the space between the rotors and does not becomes entrapped and squeezed by the rotors and wear is significantly reduced.

A preferred embodiment of the present invention relates to a rotor comprising an asymmetrical structure for a pump, wherein the rotor comprises at least one cutting edge and at least one rounded edge.

In an embodiment of the present invention the radius from the centre of the rotor to the cutting edge is substantially the same as the radius from the centre of the rotor to the rounded edge.

The term "substantially the same" in respect of the difference between the radius of the cutting edge relative to the rounded edge (or vice versa) relates to a difference of 5% or less; such as 4% or less; e.g. 3% or less; such as 2% or less; e.g. 1% or less; such as 0.5% or less; e.g. 0.1% or less; such as 0.05% or less; e.g. 0.01% or less; such as 0.001% or less; e.g. 0%.

In an embodiment of the present invention the rotor may be a single-impeller; a double-impeller; a tri-impeller; or a multiple-impeller. In the present context the impeller may be the part of the rotor that moves the material from the inlet of a pump to the outlet of the pump. A rotor comprising a single-impeller has only one part moving the material through the pump; a rotor having double-impeller has two parts moving the material; a rotor having a tri-impeller has tree parts moving the material; and a rotor having multiple-impeller has multiple parts moving the material.

The at least one cutting edge of the rotor may preferably be a sharpened edge that together with a sharpened edge on the inlet of the pump is responsible for shredding and grinding of the material to be pumped.

The cutting edge of the rotor may be provided with a coating in order to make the cutting more efficient and capable of cutting hard materials. Preferably the coating further hardens the at least one cutting edge. The cutting edge may be provided with a hard coating, preferably a hard metal coating, such as steel, preferably stainless steel.

The shredding and grinding of the material to be pumped by introducing further cutting edges. In an embodiment of the present invention the rotor comprises at least two cutting edges and at least two rounded edges; such as at least 3 cutting edges and at least 3 rounded edges; e.g. at least 4 cutting edges and at least 4 rounded edges; such as at least 4 cutting edges and at least 4 rounded edges.

In order to provide the cutting effect of the cutting edge the rotor may be placed correctly in the pump and provided with the correct rotation.

Upon rotation the at least one cutting edge (2) may be a leading edge and the at least one rounded edge (3) may be a tailing edge.

The rotor according to the present invention may be designed from a first circular element where a material-moving cavity is provided in the first circular element. The material-moving cavity may be provided by a cutting in the first circular element or the design of the rotor including the material-moving cavity may be moulded.

In an embodiment of the present invention the rotor comprising a first circular element comprising one or more cut-outs providing at least one material-moving cavity, having in one end a cutting edge and in another end a rounded edge.

The first circular element may have a convex surface. Preferably, the convex surface of the rotor makes a perfect fit with the concave wall of the pumping surface of a pump, such as a positive displacement pump, e.g. a lobe pump or a rotary lobe pump. In the present context the term "perfect fit" relates to an improved mechanical engagement of the first circular element with the circular wall of the pumping chamber. The perfect fit of the first circular element with the circular wall of the pumping chamber assist in an improved pumping effect and a reduced tendency for particles and solid parts pumped to become entrapped between the rotors and the wall of the pumping chamber, which entrapment may result in in increased friction of the rotors and the pump, a need for higher energy input to provide sufficient pumping effect, as well as an increased wear of the rotors and the pump. Thus, the rotors of the present invention may provide a decreased friction, a reduced power consumption and a decreased wear of the rotors.

In a further embodiment of the present invention the rotor may comprise at least one material moving cavity, such as at least two material moving cavities, e.g. at least three material moving cavities, such as at least 3 material moving cavities, e.g. at least 4 material moving cavities. Preferably. the rotor comprises 2 material moving cavities.

The size and/or structure of the at least one material-moving cavity may be defined by a second circular element; a first concave recess; and a second concave recess. The second circular element may be determined by the depth of the material-moving cavity and may vary depending on the material to be pumped.

The intersection between the first concave recess and the first circular element, in particular the outer edge of the first circular element, may provide the at least one cutting edge. The form of the first concave recess may be changed depending on the type, complexity and amount of the material to be pumped and the degree of shredding/grinding desired.

The intersection between the second concave recess and the first circular element, in particular the outer edge of the first circular element, provides the at least one rounded edge. The form of the second concave recess may be changed depending on the type and complexity of the material to be pumped in order to avoid hard particles gets stock between the two rotors in a pump and hence reduce the friction and wear of the rotors.

In an embodiment of the present invention the first circular element comprises a radius in the range of 5-50 cm, such as in the range of 7-40 cm, e.g. in the range of 10-30 cm, such as in the range of 12-25 cm, e.g. in the range of 15-20 cm, such as about 17 cm.

In another embodiment of the present invention the second circular element comprises a radius in the range of 1-20 cm, such as in the range of 3-15 cm, e.g. in the range of 5-12 cm, such as in the range of 6-10 cm, e.g. about 8 cm.

Preferably, the first circular element comprises a radius in the range of 5-50 cm, such as in the range of 7-40 cm, e.g. in the range of 10-30 cm, such as in the range of 12-25 cm, e.g. in the range of 15-20 cm, such as about 17 cm; and the second circular element comprises a radius in the range of 1-20 cm, such as in the range of 3-15 cm, e.g. in the range of 5-12 cm, such as in the range of 6-10 cm, e.g. about 8 cm.

In an embodiment of the present invention the radius of a second circular element may be between 20-80% of a radius of a first circular element, providing the material-moving cavity, such as between 25-70%, e.g. between 30-60%, such as between 40-55%, e.g. between 45-50%.

In a further embodiment of the present invention the rotor may have a width which is in the range of 1-50 cm, such as in the range of 5-45 cm, e.g. in the range of 10-40 cm, such as in the range of 15-35 cm, e.g. in the range of 20-30 cm, such as about 25 cm.

The rotor may be prepared from a metal material; a plastic material; a ceramic material and/or a combination hereof.

The rotor may preferably be prepared from a single material, either by cutting or moulding.

A further preferred embodiment of the present invention relates to a pump comprising one or more rotors according to the present invention.

Preferably, the pump according to the present invention comprises two rotors according to the present invention.

The pump may preferably be a positive displacement pump, even more preferably, the positive displacement pump may be a lobe pump or a rotary lobe pump.

The pump according to the present invention comprises an inlet for feeding material to the pump and an outlet for taken out the pumped material or for feeding the material to a further processing device.

A further processing device may be a hydrolyser; a decanter; dryer; an air turbulence mill; or the like.

In an embodiment of the present invention the pump may comprise a square or rectangular shaped inlet and/or a square or rectangular shaped outlet.

In order to improve the flow through the pump the inlet of the pump and/or the outlet of the pump have substantially the same width as the width of the rotor. In the present context the term "substantially the same" relates to an inlet and/or an outlet which is/are 10% smaller or less relative to the width of the rotor; such as 8% smaller or less; e.g. 6% smaller or less; such as 4% smaller or less; e.g. 2% smaller or less; such as 4% smaller or less; e.g. has the same width as the rotor.

In an embodiment of the present invention the outlet has the same, or substantially the same, width as is the inlet.

In order to avoid friction between the rotor and the pumping chamber the rotor may have a width which is 0.1-5 cm smaller than the internal width of a pumping chamber of a pump.

In an embodiment of the present invention the width of the inlet and/or the width of the outlet is between 25-98% of the width of the rotor, such as between 40-94%, e.g. between 50-96%, such as between 60-92%, e.g. between 70-90%, such as in the range of 75-85%.

In order to improve and support the shedding/grinding effect of the pump the inlet may be provided with a sharpened edge. The sharpened edge may be provided for cutting the particles and solid parts of the material into smaller pieces (this being done in combination with the cutting edge on the rotor).

The rotors are mounted in the pump for rotating in opposite directions.

In an embodiment of the present invention a pair of identical rotors are invertible mounted on rotating shafts in the pumping chamber of the pump. The rotating shafts preferably rotates in opposite directions.

The pump is suitable for pumping a material comprising particles and/or solid parts.

Preferably, the material to be pumped comprises particles and/or solid parts having a particle sizes above 0.5 mm, such as above 1 mm, e.g. above 5 mm, such as above 1 cm, e.g. above 3 cm, such as above 5 cm, e.g. above 10 cm, such as in the range of 0.50 mm-40 cm; e.g. in the range of 1-35 cm; such as 5-30 cm; e.g. in the range of 10-25 cm; such as 15-20 cm.

In an embodiment of the present invention the material may be in the form of a liquid, a slurry, a paste or a dough. Preferably, the material may be a rendering material.

Preferably, the rendering material may have a moisture content of 15% (w/w) or more, such as 20 (w/w) or more, e.g. 25% (w/w), such as 30 (w/w) or more, e.g. 40% (w/w), such as 50 (w/w) or more, e.g. 60% (w/w), such as 70 (w/w) or more, e.g. in the range of 15-70% (w/w), such as in the range of 20-60% (w/w), e.g. in the range of 25-55% (w/w), such as in the range of 30-50% (w/w), e.g. in the range of 40-45% (w/w).

In a further embodiment of the present invention the rendering material may be a feather rendering material; a meat rendering material; a blood rendering material; a bone rendering material; an offal rendering material; a hair rendering material; or any combination hereof.

The rotors are mounted in a pump, such as a displacement pump, e.g. a lobe pump of a rotary pump, with two opposite rotating rotors. Both rotors are provided with a cutting edge on the front, in a leading edge, relative to the rotation direction. On the back of both rotors there is a rounding edge (a slip/a tailing edge, relative to the rotation direction) which ensures reduced resistance or friction in the pump. Possibly, materials caught during the rotation of the two rotors are released on the tailing edge of the rotor.

The two rotors may preferably be made of two solid pieces. The inlet of the pump is also provided with a cutting edge, throughout the width. The rotors and the pumping chamber are fitted to each other and there is only a very small space where the two rotors pass the wall of the pumping chamber. Thereby, the cutting effect is obtained from the cutting edge of the rotor and the cutting edge of the inlet which gives the shredding and grinding of the material.

When moving inhomogeneous media containing particles or solid parts, for example: crude sludge; chopped animal & slaughtered waste like animal offal; bones and blood; feathers, hoof, nails hair; fish and fish waste and the like.

The rotor and the pump according to the present invention provides a design which makes it possible to precisely subdivide, chop and pump even very inhomogeneous materials, while at the same time reducing the power considerably.

The pump is designed so that inlet and outlet have substantially the same width as the rotors mounted inside the pump. This may assist larger particles to be sucked in and pressed out of the pump. The invention minimizes the power needed. It reduces maintenance to a minimum due to the few internal parts and the low friction. Often a breakdown may be required for the materials to pass through the pump, and this effect may be provided by the pump according to the present invention.

The rotor and the pump differentiate from the prior art by combining the cutting effect on the two rotors with the rounding/slip of the asymmetric rotors on the tailing edge.

The pump housing may preferably be constructed symmetrically while the two rotors according to the present invention are constructed asymmetrical, and it may be possible to pump in the opposite direction with the same pump installation by reversing the two rotors mounted in the pump.

Since internal friction is reduced by the present invention the pump may withstand dry running. Also, a reduced power may be required for pumping a given amount of media at a particular pressure. The rounding edge ensures that particles or excess material can escape without wearing the rotors or the pump. Depending on the nature of the medium, the size of the rounding radius and/or shape can be varied. This ensures minimal resistance between the medium being pumped and the pump rotors.

In a preferred embodiment of the present invention the pump may be used in moving and grinding a rendering material.

Preferably, the rendering material relates to a feather rendering material; a meat rendering material; a blood rendering material; a bone rendering material; an offal rendering material; a hair rendering material; or a combination hereof.

Another preferred embodiment of the present invention relates to a method for producing a digestible material, from a material selected from feather; hair; hoof; nails, bone, meat or a combination hereof, said method comprising the steps of:
 (i) moving and grinding the material to a hydrolyzer using a grinding pump;
 (ii) hydrolyzing the grinded material providing a hydrolyzed material;
 (iii) drying the resulting hydrolyzed material providing the digestible material.

Preferably the pump described in step (i) is a pump according to the present invention.

In a further embodiment of the present invention the hydrolyzing step (ii) may be performed in the presence of water; heat and at a pressure between about 2 bar and about 10 bar.

In yet an embodiment of the present invention the drying step (iii) may involve drying in a disc dryer at reduced pressure (preferably at a pressure between about 10 and about 500 mbar (abs), preferably between about 100 and about 400 mbar); in a flow of hot air such as a flash dryer, a fluidized bed dryer, ring-type dryer, rotating flash dryers and the like. Preferably, the drying using hot air involves a residence time in the dryer of 2 minutes or less; such as 1 minutes or less; e.g. 30 seconds or less, such as 20 seconds or less; e.g. 10 seconds or less, such as 5 seconds or less.

Further details on how to produce digestible or highly digestible materials are known to the skilled person. Specific examples of producing digestible or highly digestible materials may be as described in EP 2 832 236; EP 3 192 377 and/or EP 3 027 065, which methods are hereby incorporated by reference.

DETAILED DESCRIPTION OF THE DRAWINGS

Figure 2:
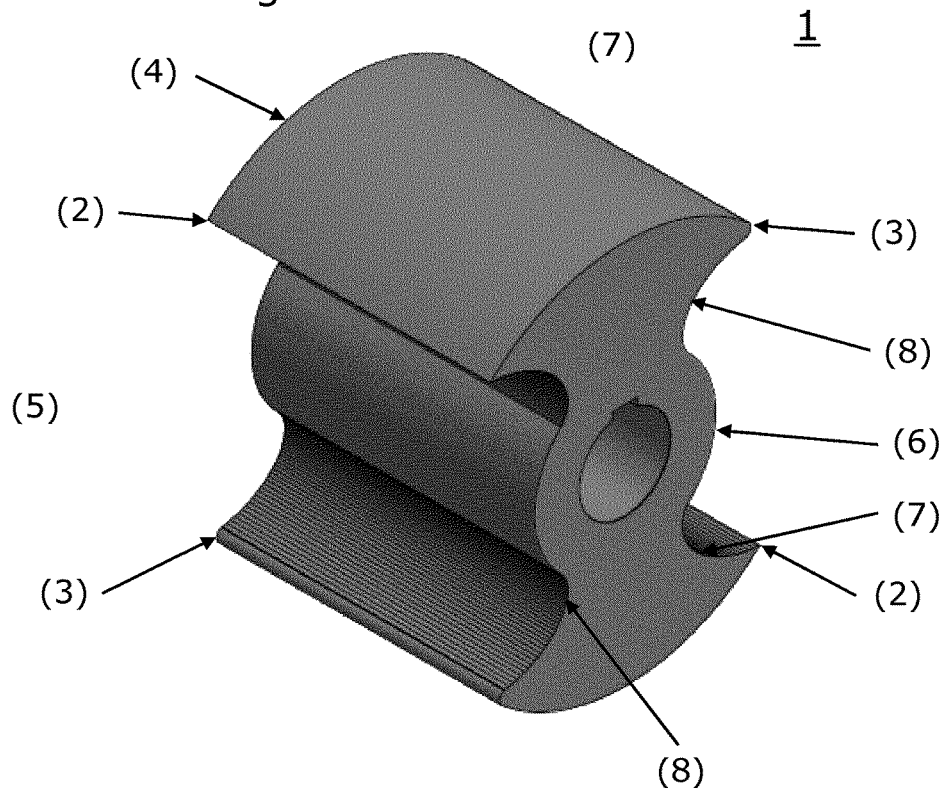
FIG. 2 shows a sideview of the rotor (1) according to the present invention with the cutting edges (2) and the rounded edges (3)

FIGS. 1 and 2 show the rotor (1) according to the present invention. The rotor (1) may comprise 2 cutting edges (2) for shedding or grinding the material to be pumped. and 2 rounded edges (3). Depending on the application the rotor (1) may comprise further cutting edges (2) and further rounded edges (3), Preferably, the rotor (1) comprises at least two cutting edges (2) and at least two rounded edges (3). The rotor (1) comprises a radius (r1) from the centre (C) of the rotor to the cutting edge is substantially the same as the radius (r2) from the centre (C) of the rotor to the rounded edge. Preferably, the radius from the centre (C) of the rotor to the cutting edge is 5% or less than the radius from the centre (C) of the rotor to the rounded edge. In operation the at least one cutting edge (2) may be a leading edge and the at least one rounded edge (3) may be a tailing edge. The rotor may be provided with a first circular element (4) which matches the outer circumference of the rotor (1) illustrated in FIG. 1 as a dashed line. The first circular element (4) comprising one or more cut-outs providing at least one material-moving cavity (5), having in one end a cutting edge (2) and in another end a rounded edge (3). The at least one material-moving cavity (5) may be defined by a second circular element (6); a first concave recess (7); and a second concave recess (8). The rotor (1) may have several material-moving cavities (5), preferably the rotor (1) according to the present invention comprises 2 material-moving cavities (5). The intersection between the first concave recess (7) and the first circular element (4) provides the at least one cutting edge (2) and the intersection between the second concave recess (8) and the first circular element (4) provides the at least one rounded edge (3). The first circular element (4) may comprise a radius in the range of 5-50 cm and the second circular element (6) may comprise a radius in the range of 1-20 cm. In order to improve the cutting effect of the rotor of the present invention the cutting edge (2) may be sharpened and/or provided with a hard sharpened coating, e.g. a hard metal coating.

Figure 3:
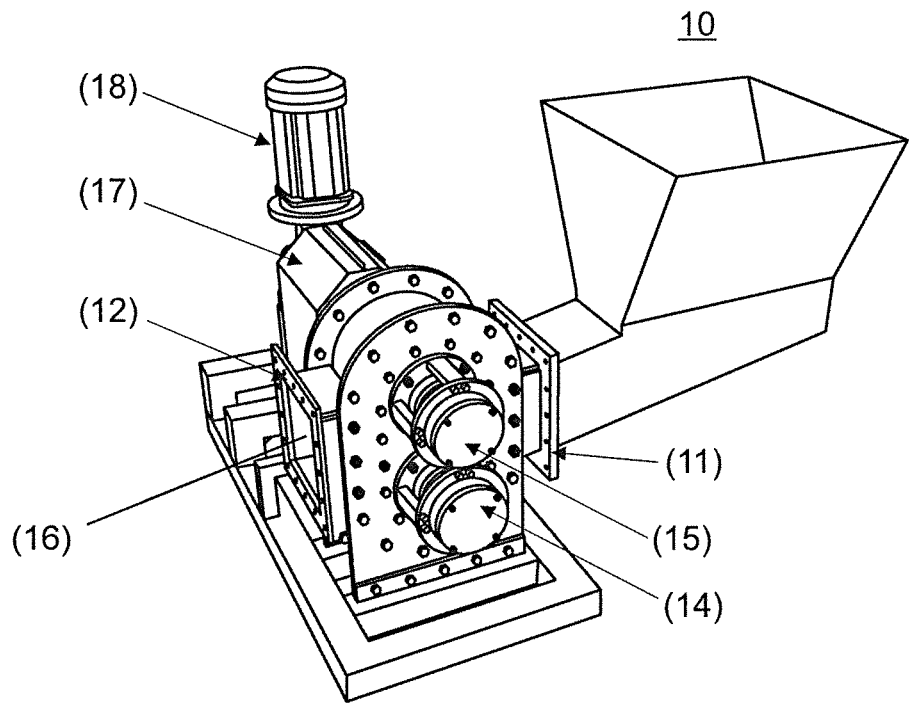
FIG. 3 shows a pump (10) having the rotors (not shown) mounted inside the closed pumping chamber.
Figure 4:
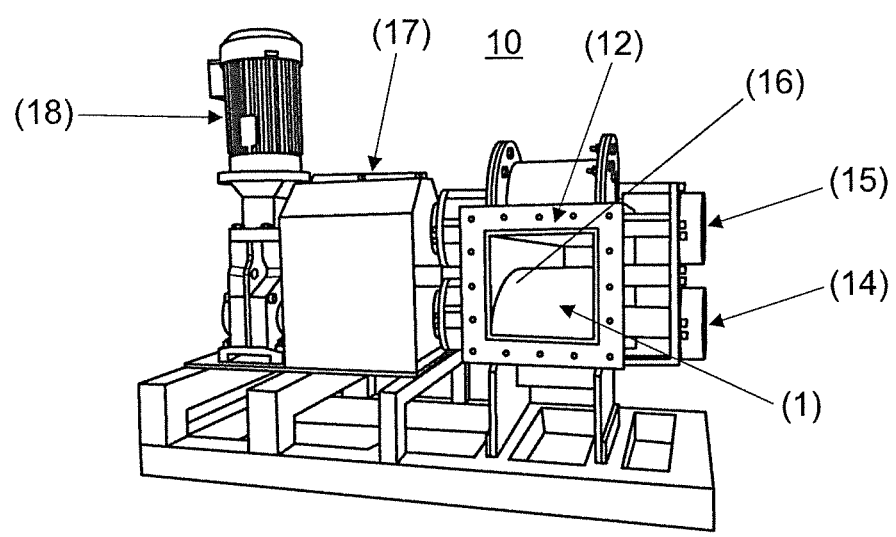
FIG. 4 shows a pump (10) with the outlet (12) and having the rotors (1) mounted inside the pumping chamber.

FIGS. 3 and 4 shows a pump (10) such as a positive displacement pump, e.g. a lobe pump or a rotary lobe pump, comprising a rotor (1) according to the present invention (the rotor (1) has not been shown in FIG. 3). The pump (10) comprises a square formed outlet (12) and the outlet (12) has the same, or substantially the same, width as is the inlet (11). The pump (10) may be designed so that the inlet (11) and the outlet (12) have substantially the same width as the rotors (1) mounted inside the pump on the rotating shafts (14 and 15) in the pumping chamber (16). Rotation of the rotors (1) in the pumping chamber (16) is controlled by a gearing (17) and a motor (18). The material to be pumped may be material is in the form of a liquid, a slurry or a dough. Preferably, the material to be pumped has a moisture content in the range of 15-70% (w/w). The material is a rendering material, such as a feather rendering material; a meat rendering material; a blood rendering material; a bone rendering material; an offal rendering material; a hair rendering material; or a combination hereof.

Figure 5:
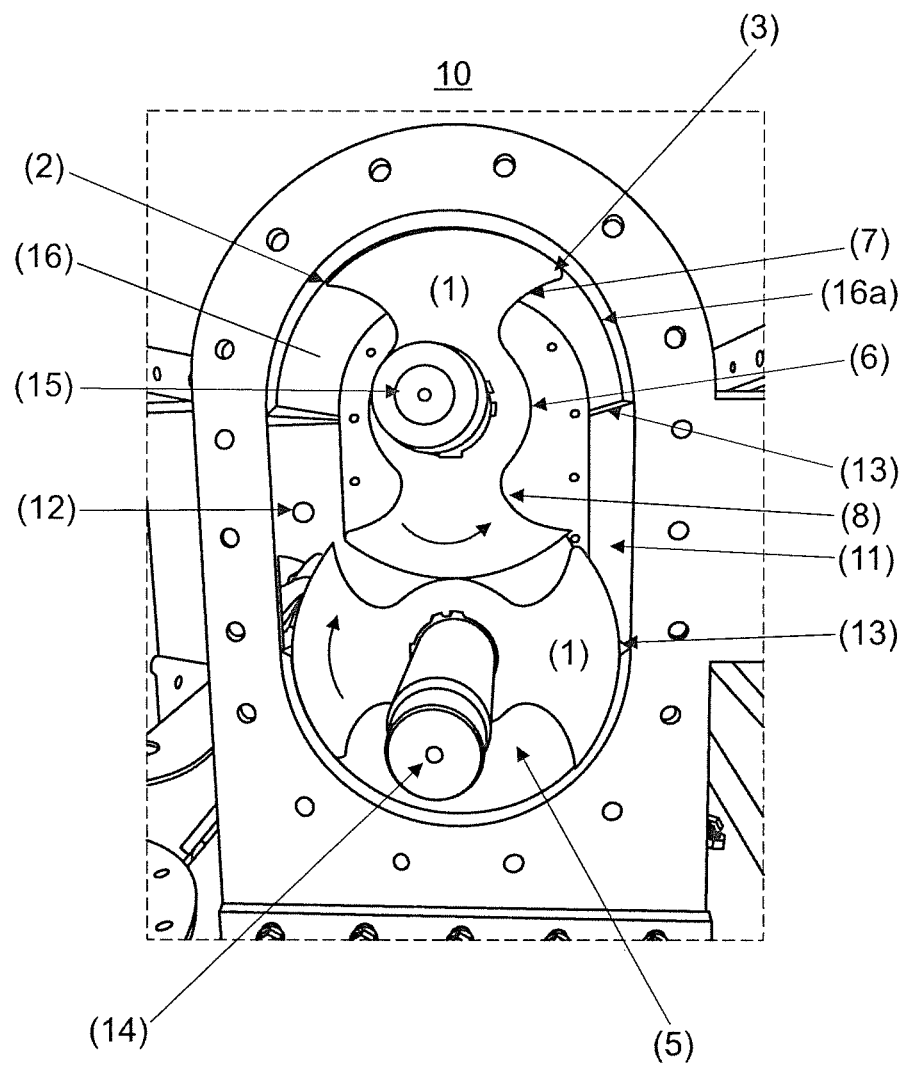
FIG. 5 shows a pump (10) having the rotors (1) mounted inside the pumping chamber.

FIG. 5 shows a pump (10) such as a positive displacement pump, e.g. a lobe pump or a rotary lobe pump, comprising a pumping chamber (16) having two rotors (1) mounted inside the pump on rotating shafts (14 and 15) in the pumping chamber (16). Each rotor (1) comprising two cutting edges (2) for shedding or grinding the material to be pumped and two rounded edges (3) allowing particles and material to escape from the space between the two rotors (1). The arrows marked on the rotors (1) demonstrates the rotation direction of the rotors which are substantially perpendicular placed relative to each other. The pump (10) comprises a square formed outlet (12) and the outlet (12) has the same, or substantially the same, width and form as is the inlet (11). The Inlet (11) is further provided with a sharpened edge (13) that together with the cutting edge (2) of the rotor is capable of shedding and grinding the particles and/or solid parts of the material to be pumped. Each rotor (1) provides a material-moving cavity (5) between the second circular element (6); the first concave recess (7); the second concave recess (8) and the wall of the pumping chamber (16a).

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

REFERENCES

EP 2 832 236
EP 3 192 377
EP 3 027 065

The invention claimed is:

1. A rotor (1) comprising an asymmetrical structure for a pump, wherein the pump includes two identical rotors, for moving and grinding inhomogeneous materials, wherein each rotor (1) comprises at least one cutting edge (2) and at least one rounded edge (3) and each rotor (1) comprises a first circular element (4) where at least one material-moving cavity (5) is provided in the first circular element (4), wherein the at least one rounded edge is defined at an intersection between a second concave recess (8) of the at least one material-moving cavity and an outer edge of the first circular element, wherein each rotor has a center and a radius from the center to the at least one cutting edge is substantially the same as a radius from the center of each rotor to the at least one rounded edge.

2. The rotor (1) according to claim 1, wherein the radius from the center of each rotor to the cutting edge differs by 5% or less from the radius from the center of each rotor to the at least one rounded edge.

3. The rotor (1) according to claim 1, wherein the at least one cutting edge (2) is a leading edge and the at least one rounded edge (3) is a tailing edge.

4. The rotor (1) according to claim 1, wherein the at least one material-moving cavity comprises one or more cut-outs.

5. The rotor (1) according to claim 1, wherein the size, structure, or both the size and structure of the at least one material-moving cavity (5) is defined by a second circular element (6); a first concave recess (7); and the second concave recess (8).

6. The rotor (1) according to claim 1, wherein the first circular element (4) has a convex surface.

7. The rotor (1) according to claim 6, wherein the convex surface of each rotor (1) makes a perfect fit with a concave wall of a pumping surface of the pump.

8. The rotor (1) according to 13, wherein each rotor comprises at least two material moving cavities (5).

9. The rotor (1) according to claim 5, wherein an intersection between the first concave recess (7) and the outer edge of the first circular element (4) provides the at least one cutting edge (2) or an intersection between the second concave recess (8) and the first circular element (4) provides the at least one rounded edge (3), or both.

10. A pump (10) comprising the two identical rotors (1) according to claim 1.

11. The pump (10) according to claim 10, wherein the pump is a positive displacement pump, wherein the positive displacement pump is a lobe pump or a rotary lobe pump.

12. The pump (10) according to claim 10, wherein the pump comprises
 a square or rectangular shaped inlet (11) wherein the inlet is provided with a sharp edge (13), or
 a square or rectangular shaped outlet (12), or both.

13. The pump (10) according to claim 10, wherein the material is a rendering material.

14. The pump of claim 10 wherein the at least one material moving cavity (5) is defined by a second circular element (6); a first concave recess (7); the second concave recess (8); and a wall of a pumping chamber of the pump.

15. The pump of claim 10, wherein the two identical rotors are invertedly mounted on rotating shafts in a pumping chamber of the pump and the rotating shafts rotate in opposite directions.

16. A method for producing a digestible material from a material selected from feather; hair; hoof; nails, bone, meat or a combination thereof, said method comprising:
 (i) moving and grinding the material to a hydrolyzer using a grinding pump, wherein the pump is a pump according to claim 10;
 (ii) hydrolyzing the grinded material providing a hydrolyzed material;
 (iii) drying the resulting hydrolyzed material providing the digestible material.

* * * * *